(12) United States Patent
Neudecker et al.

(10) Patent No.: US 6,242,132 B1
(45) Date of Patent: Jun. 5, 2001

(54) SILICON-TIN OXYNITRIDE GLASSY COMPOSITION AND USE AS ANODE FOR LITHIUM-ION BATTERY

(75) Inventors: Bernd J. Neudecker, Knoxville; John B. Bates, Oak Ridge, both of TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/057,147

(22) Filed: Apr. 7, 1998

Related U.S. Application Data (60) Provisional application No. 60/043,188, filed on Apr. 16, 1997.

(51) Int. Cl.$^7$ ................. H01M 4/58; H01M 4/48
(52) U.S. Cl. ................. 429/218.1; 429/231.1
(58) Field of Search ........... 429/218.1, 231.9, 429/231.95, 231.1; 423/332, 337

(56) References Cited

U.S. PATENT DOCUMENTS

| 4,008,950 | * | 2/1977 | Chapman et al. ............ 350/160 R |
| 5,322,825 | * | 6/1994 | Leung et al. ............... 501/92 |
| 5,445,887 | * | 8/1995 | Casti ...................... 428/408 |
| 5,474,861 | * | 12/1995 | Bito et al. ................ 429/194 |
| 5,512,387 | * | 4/1996 | Ovshinsky .................. 429/152 |

FOREIGN PATENT DOCUMENTS

| 6-290782A | * | 10/1994 | (JP) ............ H01M/4/58 |
| 11-102705 | * | 4/1999 | (JP) ............ H01M/4/58 |
| WO 98/47196 | * | 10/1998 | (WO) ........... H01M/4/58 |

* cited by examiner

Primary Examiner—Carol Chaney
(74) Attorney, Agent, or Firm—Joseph A. Marasco; George L. Craig (57) ABSTRACT

Disclosed are silicon-tin oxynitride glassy compositions which are especially useful in the construction of anode material for thin-film electrochemical devices including rechargeable lithium-ion batteries, electrochromic mirrors, electrochromic windows, and actuators. Additional applications of silicon-tin oxynitride glassy compositions include optical fibers and optical waveguides.

25 Claims, 6 Drawing Sheets

SILICON-TIN OXYNITRIDE GLASSY COMPOSITION AND USE AS ANODE FOR LITHIUM-ION BATTERY

CROSS-REFERENCE TO RELATED APPLICATIONS

This application claims the benefit of U.S. Provisional Application Ser. No. 60/043,188, filed on Apr. 16, 1997, the entire disclosure of which is incorporated herein by reference.

The United States Government has rights in this invention pursuant to contract no. DE-AC05-960R22464 between the United States Department of Energy and Lockheed Martin Energy Research Corporation.

FIELD OF THE INVENTION

The present invention relates to anode compositions for lithium-ion batteries, and more particularly to compositions which comprise a silicon-tin oxynitride glassy material.

DESCRIPTION OF THE INVENTION

In "lithium" type batteries, the anode comprises lithium metal. Such systems are generally characterized by disadvantages such as:

1. The service temperature of the battery is generally <100° C., preferably <70° C., due to the high reactivity of lithium with any protective battery coating and owing to the low melting point thereof (180.5° C.), which makes lithium metal creep long before this temperature is reached. This problem has been mitigated by alloying the lithium with a suitable solute element to raise the melting point of the anode. See U.S. Pat. No. 5,705,293 issued on Jan. 6, 1998 to Hobson.

2. Cell fabrication requires thermal evaporation of lithium in vacuum below $10^{-6}$ mbar and subsequent handling in an argon filled glove box.

3. Battery integration into electronic modules requires in many cases temperatures as high as 250° C. which would melt the anode. In "lithium-ion" batteries, however, the anode comprises a host matrix filled with the electroactive lithium species having an electrochemical lithium activity lower than unity, i.e. lithium metal is not present. Among the best host matrices for anode application are lithium alloys, various kinds of carbon, and transition metal oxides. However, lithium alloys are known to lose considerable capacity upon cycling, transition metal oxides such as $Li_4Ti_5O_{12}$ discharge well above 1 V vs. $Li^+/Li$ thereby significantly reducing the specific energy of the battery, and thin-film amorphous lithium-carbon anodes show at best moderate specific discharge capacities and are typically highly resistive to lithium ion transport.

A silicon-tin oxynitride anode in accordance with the present invention does not require handling in a glove-box. After being heated at 250° C. for 1 hr in air, a silicon-tin oxynitride/lithium phosphorous oxynitride/$LiCoO_2$ battery, which can be prepared totally by sputtering, shows an increased reversible discharge capacity of about 10% in the range of 4.2V to 2.7V. The corresponding anode potential in this range is 0–1.0 V vs. $Li^+/Li$. The battery can deliver a volumetric discharge capacity (discharge capacity per volume) of more than 260 $\mu Ah/cm^2 \times \mu m$ in this voltage range at 1 $mA/cm^2$. This is more than 5 times higher than the volumetric discharge capacity of the lithium-carbon anode, which gives 56 $\mu Ah/cm^2 \times \mu m$ between 0–1.3 V vs. $Li^+/Li$ at only 10 $\mu A/cm^2$. Moreover, long-term cycling tests (>3000 cycles) reveal that the battery's discharge capacity fades by only 0.001% per cycle. For further information on the behavior of the lithium-carbon anode, refer to R. B. Goldner et al., *Development of a Thin Film $Li_{1-y}CoO_2/Li_xC_6$ Rocking-Chair Battery*, Thin Film Ionic Devices and Materials, J. B. Bates, Editor, p. 173, The Electrochemical Society Proceedings Series. Vol. 95–22, Pennington, N.J. (1996).

The crystallization and decomposition of $SnO-SiO_2$ glasses, including $SnSiO_3$ glass, is well known and reported in the technical literature.

The use of Sn (crystalline), SnO (crystalline), $SnO_2$ (crystalline), $Li_2SnO_3$ (crystalline), and $SnSiO_3$ (glassy) as anodes in lithium-ion batteries has recently been described by I. A. Courtney et al. in *Electrochemical and In-Situ X-ray Diffraction Studies of the Reaction of Lithium with Tin Oxide Composites*, J. Electrochem. Soc., Vol. 144, No. 6, p. 2045–2052, June, 1997.

U.S. Pat. No. 5,618,640 issued on Apr. 8, 1997 to Idota et al. describes the materials which are suitable for negative bulk electrodes (anodes) in nonaqueous secondary (rechargeable) batteries: Tin-silicon oxides, tin-silicon-phosphorous oxides, tin-silicon-phosphorous-aluminum oxides, and tin-silicon oxyfluorides. Excellent cycling capabilities are reported, but no figures on battery performance are provided. No oxynitrides are mentioned therein. Idota et al. is further discussed hereinbelow.

U.S. Pat. No. 5,395,711 issued on Mar. 7, 1995 to Tahara et al. relates to $Li_xSiO_y$ ($x \geq 0$ and $2>y>0$) as a negative bulk electrode in nonaqueous secondary batteries. No more than discharge-charge cycles are disclosed. No oxynitrides are mentioned therein.

All anodes in the above-listed literature contain conductive agents and binders.

U.S. Pat. No. 4,957,883 issued on Sep. 18, 1990 to Kobayashi et al. describes an oxynitride glass and a process for preparing same and a fiber thereof. The composition of the glass is represented by $Si-M_1-M_2-O-N$ and contains $SiO_2$, $Si_3N_4$ and $M_1O$ in amounts which, as mole %, satisfy the following equations (a) and (b):

$$(SiO_2+3\ Si_3N_4+M_1O)\times 100/(100+2\ Si_3N_4)=65\ to\ less\ than\ 100 \quad (a)$$

$$(SiO_2+3\ Si_3N_4)/M_1O=0.7\ to\ 2.3 \quad (b)$$

wherein $M_1$ is Ca, or Ca and Mg; $M_2$ is at least one of the metals selected from the group consisting of Al, Sr, La, Ba, Y, Ti, Zr, Ce, Na, K, Sb, B, Cr, Pb, V and Sn. The glass contains 0–40 mole % $SiO_2$, 26–70 mole % CaO, 0–20 mole % MgO, and over 0 to not more than 22 at. % $M_2$. Kobayashi is discussed further hereinbelow.

Accordingly, objects of the present invention include the provision of lithium-ion batteries which can withstand service temperatures of at least 250° C. without degrading, do not require glove-box handling during fabrication, and are not degraded by high-temperature device assembly processes. Further and other objects of the present invention will become apparent from the description contained herein.

In accordance with one aspect of the present invention, the foregoing and other objects are achieved by a composition of matter which includes Ca-free $Si_aSn_bO_yN_z$ wherein a+b=2, $y \leq 4$, and $0<z \leq 3$.

In accordance with another aspect of the present invention, a thin-film battery includes a cathode and an anode, the anode including $Si_aSn_bO_yN_z$ wherein a+b=2, $y \leq 4$, and $0<z \leq 3$.

For a better understanding of the present invention, together with other and further objects, advantages and capabilities thereof, reference is prepared to the following disclosure and appended claims in connection with the above-described drawings.

The material of the present invention is intended primarily for application as the negative electrode or anode of thin-film rechargeable lithium-ion batteries such as those developed at Oak Ridge National Laboratory. The silicon-tin oxynitride anodes are free of any additives such as conductive agents and binders. Values given for process parameters, film thickness, dimensions, stoichiometry, physical and chemical properties, and the like are given in terms of a general nature, and can usually vary without departing from the scope of the invention.

Targets of SiSnO₃ are prepared by cold pressing a powder mixture of commercial SiO₂ and commercial SnO in the molar ratio 1:1 into disks or plates. Targets for sputter deposition are made by cutting these bodies into pieces, placing them in a graphite dish, and melting the pieces under argon or another inert environment at a temperature of at least 860° C, preferably in the range of about 900–1100° C., most preferably at about 1000° C.

Films of silicon-tin oxynitride (SiTON) are deposited by rf magnetron sputtering of the above described targets under the following conditions:

Environment: Most preferably nitrogen, or a mixture of argon and nitrogen ranging from 1 to 99% argon, preferably <90% argon. Other inert environments are also suggested.

Total pressure: In the range of about 1–20 mTorr, preferably 5–20 mTorr, most preferably 20 mTorr.

For example, at a distance of 5 cm from the target, the deposition rate is about 35 Å/min using a gas pressure of 20 mTorr and 50 W of rf power (13.56 MHz) applied to a 2" diameter target.

As-deposited silicon-tin oxynitride films are x-ray amorphous and, as determined by Rutherford backscattering spectrometry (RBS), have the stoichiometry $Si_aSn_bO_yN_z$ where a~1, b~0.9, y~1.2, and z~1.7. In alternate forms, a small quantity of carbon is also present.

Thin-film rechargeable lithium-ion batteries with silicon-tin oxynitride anodes are prepared using the methods described in the above referenced patents and publications. Typically, a Pt cathode current collector, about 3000 Å thick, is deposited onto an alumina substrate by sputtering of a Pt target in Ar. A cathode film, 0.01 to 5 μm thick, of a lithium transition metal oxide such as $LiCoO_2$ or $LiMn_2O_4$ is deposited over the Pt current collector by sputtering or electron beam evaporation. After deposition, the substrate is placed in a furnace and heated at a rate of typically 5–20° C./min in air or in a flowing gas atmosphere of $O_2$, $N_2$, Ar, $H_2$ or mixtures thereof, to a temperature of 400 to 900° C. in order to crystallize the film and adjust its stoichiometry. The substrate is held at the final temperature for 30 min to 3 h and then cooled at a rate of 5–20° C./min to room temperature while maintaining the gas flow. The cathodes may also be used in their as-deposited amorphous state with no subsequent heat treatment after deposition. The Lipon electrolyte film, typically 1 μm thick, is deposited over the cathode by rf magnetron sputtering of a $Li_3PO_4$ target in $N_2$, and then the silicon-tin oxynitride anode, ranging from 50 Å to 5 μm in thickness, is deposited over the electrolyte. For the anode current collector, a Ti layer, about 2,000 Å thick, which is stable against high lithium activities, is sputtered on top of the anode. Alternatively, the Ti anode current collector can be replaced by a sputtered TiN anode current collector. Finally, a protective coating is applied to the battery.

Figure 1:
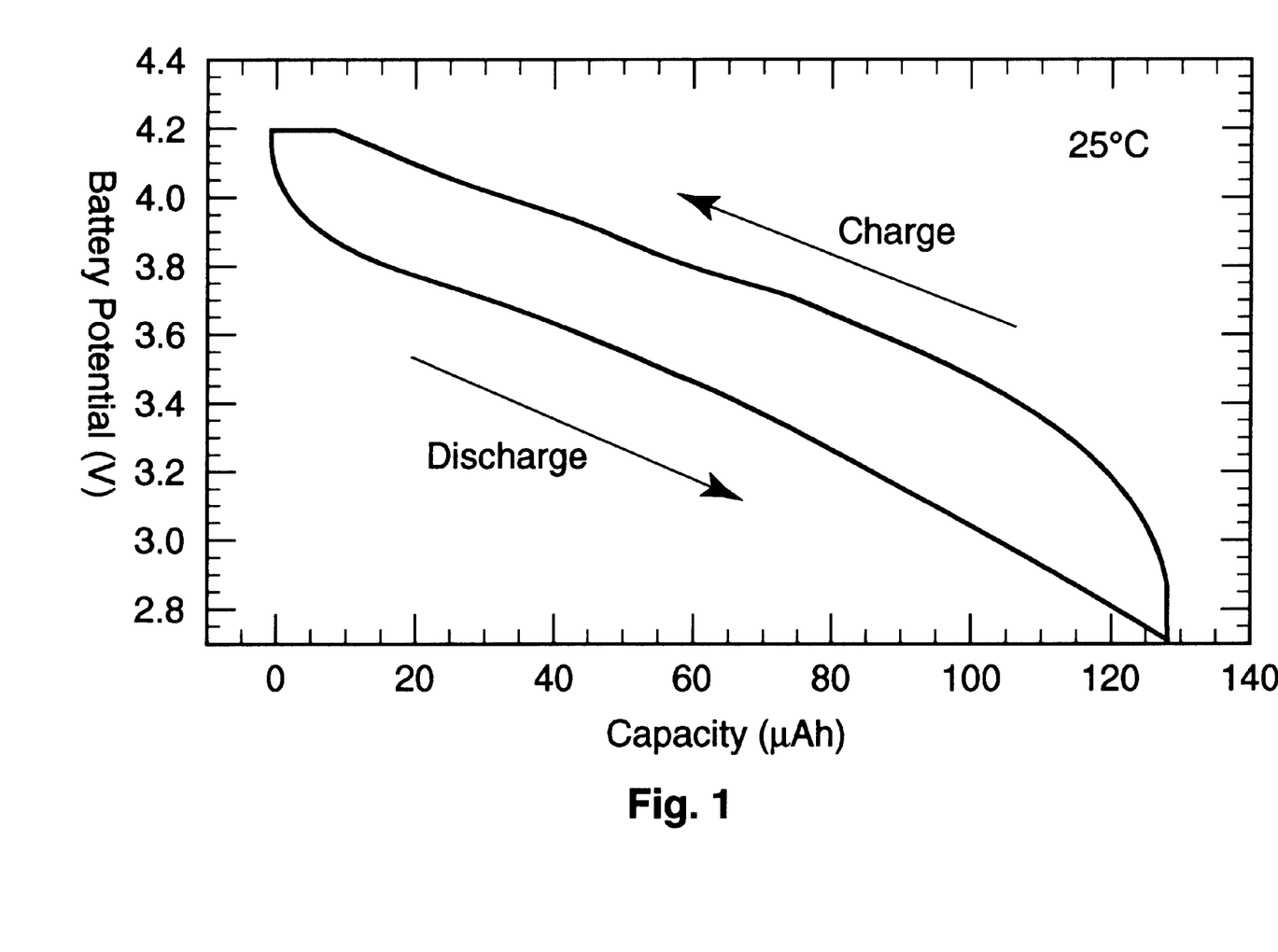
FIG. 1 is a graph showing discharge-charge capacity of a 5,500 Å×1 cm² silicon-tin oxynitride/1 μm×1 cm² Lipon/3.3 gm×1 cm² LiCoO₂ lithium-ion battery between 4.2–2.7 V at a discharge and charge current density of 100 μA/cm² (0.8 C-rate). The charge half-cycle was completed when the current density dropped below 1 μA/cm² at the 4.2 V-cutoff voltage.

Discharge-charge curves of a lithium-ion battery with the construction, 5500 Å×1 cm² silicon-tin oxynitride/1 μm×1 cm² Lipon/3.3 μm×1 cm² LiCoO₂ obtained from a cycle test between 4.3×2.7 V are shown in FIG. 1. The current density was 100 μA/cm² which corresponds to a C-rate of 0.8 C. C-rate is defined as the rate at which the full capacity can be discharged in 1 h.

Figure 2:
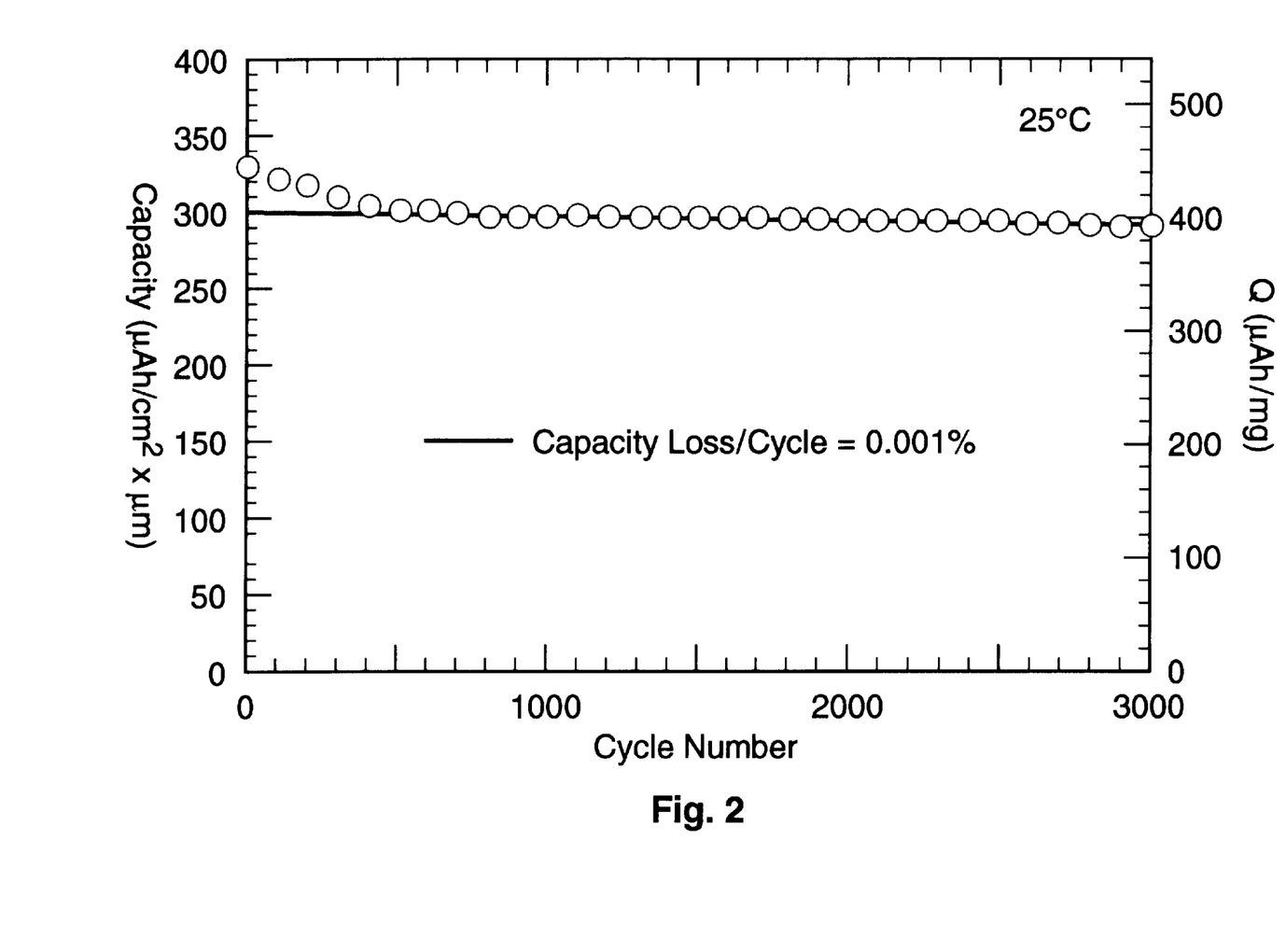
FIG. 2 is a graph showing cycling behavior of the reversible discharge capacity per as-deposited anode volume and of the reversible discharge capacity per mass of fully lithiated anode of a 100 Å×1.2 cm² silicon-tin oxynitride/1.5 μm×1.2 cm² Lipon/2,000 Å×1.2 cm² LiCoO₂ lithium-ion battery as a function of cycle number within the voltage window 3.93–2.7 V at 100 μA (30 C-rate). The coulombic efficiency, defined as the discharge capacity in cycle n divided by the charge capacity of the preceding half-cycle, is 1.0 after cycle 400.

As illustrated in FIG. 2, the capacity fade per cycle of a 100 Å×1.2 cm² silicon-tin oxynitride/1 μm×1.2 cm² Lipon/3.3 μm×1.2 cm² LiCoO₂ lithium-ion battery was only 0.001% after 3,000 cycles. This value is much smaller than capacity fade per cycle values reported for any other lithium ion battery. The specific capacity and the volumetric capacity in units of μAh per unit of area and unit of thickness are also shown in FIG. 2. The current density was 100 μA/ 1.2 cm² which corresponds to a C-rate of about 30 C. The anode thickness was calculated from the measured deposited mass and the known density of the anode which in turn was determined from profile measurements of 2 μm thick silicon-tin oxynitride films of known mass. Note that the coulombic efficiency, i.e. the ratio of discharge capacity and charge capacity of the preceding half-cycle, is 1.0.

Figure 3:
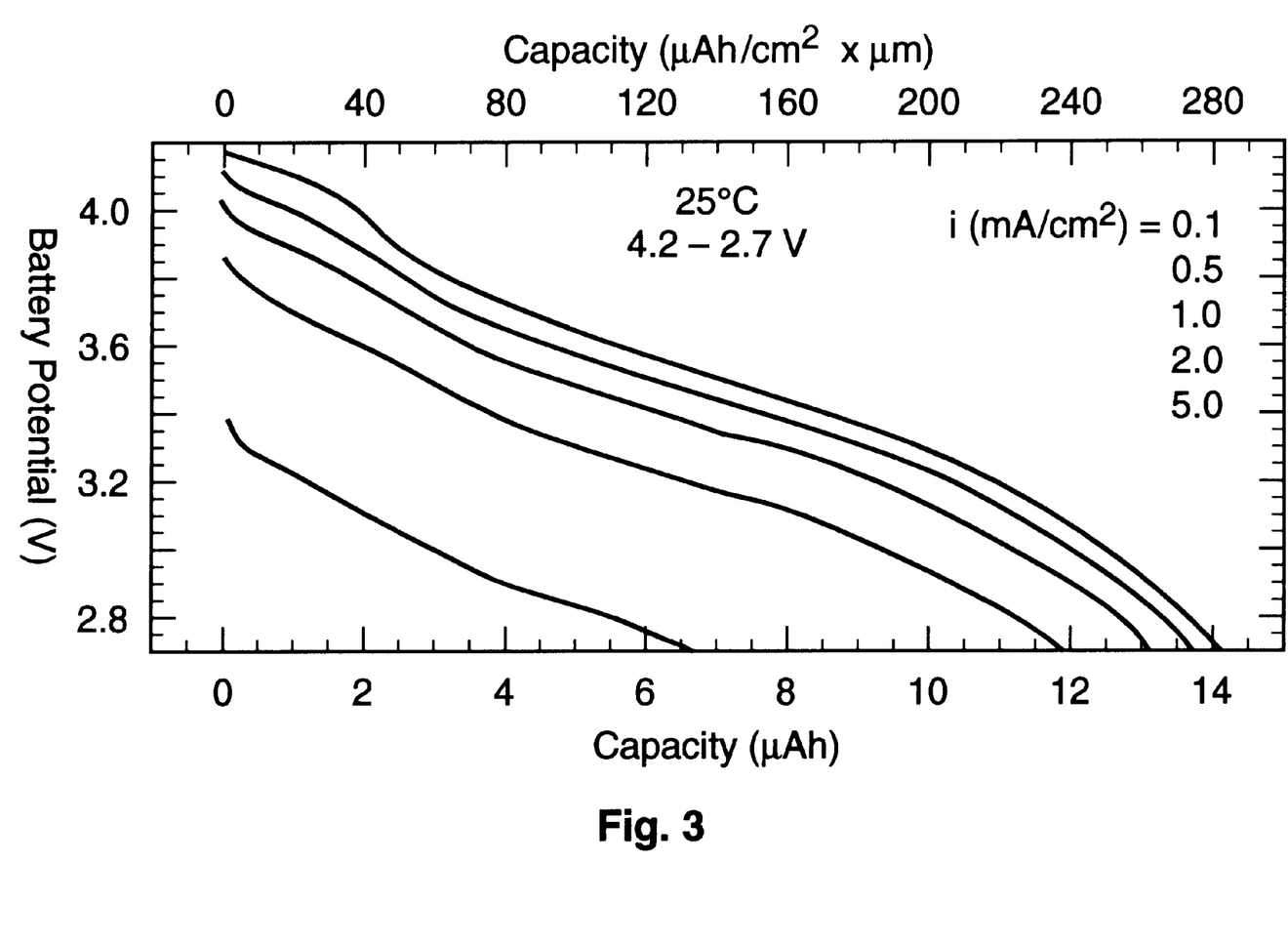
FIG. 3 is a graph showing discharge performance of a 500 Å×1 cm² silicon-tin oxynitride/1 μm×1 cm² Lipon/6,000 Å×1 cm² LiCoO₂ lithium-ion battery at different current densities in the voltage range 4.2–2.7 V.
Figure 4:
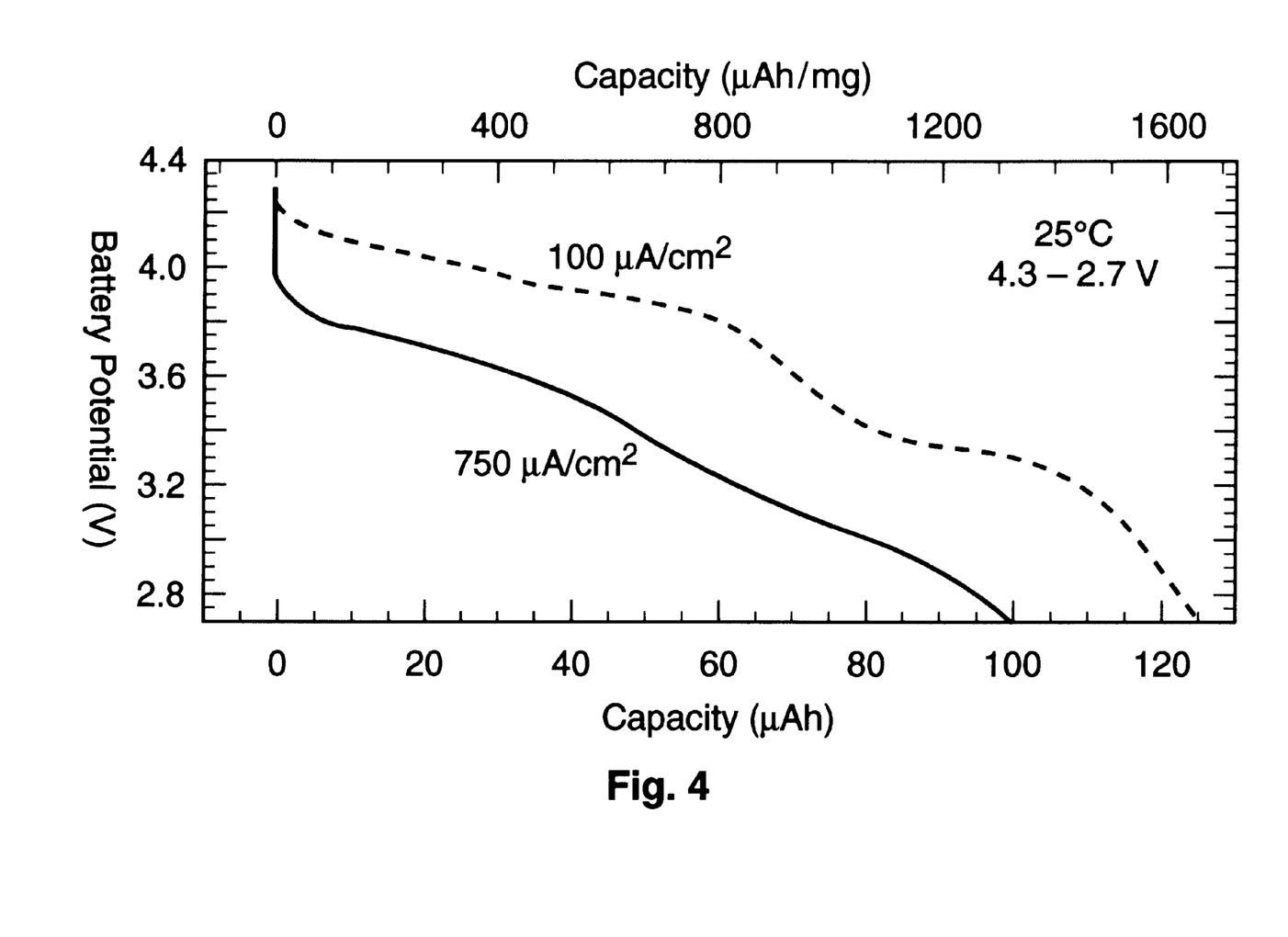
FIG. 4 is a graph showing discharge performance of a 600Å×1 cm² silicon-tin oxynitride/1 μm×1 cm² Lipon/2.3 m×1 cm² LiCoO₂ battery between 4.3–2.7 V at 100 μA/cm² and at 750 μA/cm². Lithium metal is plated at the anode-electrolyte interface. The specific discharge capacity is calculated on the basis of the mass of the lithiated anode at 4.3 V.
Figure 5:
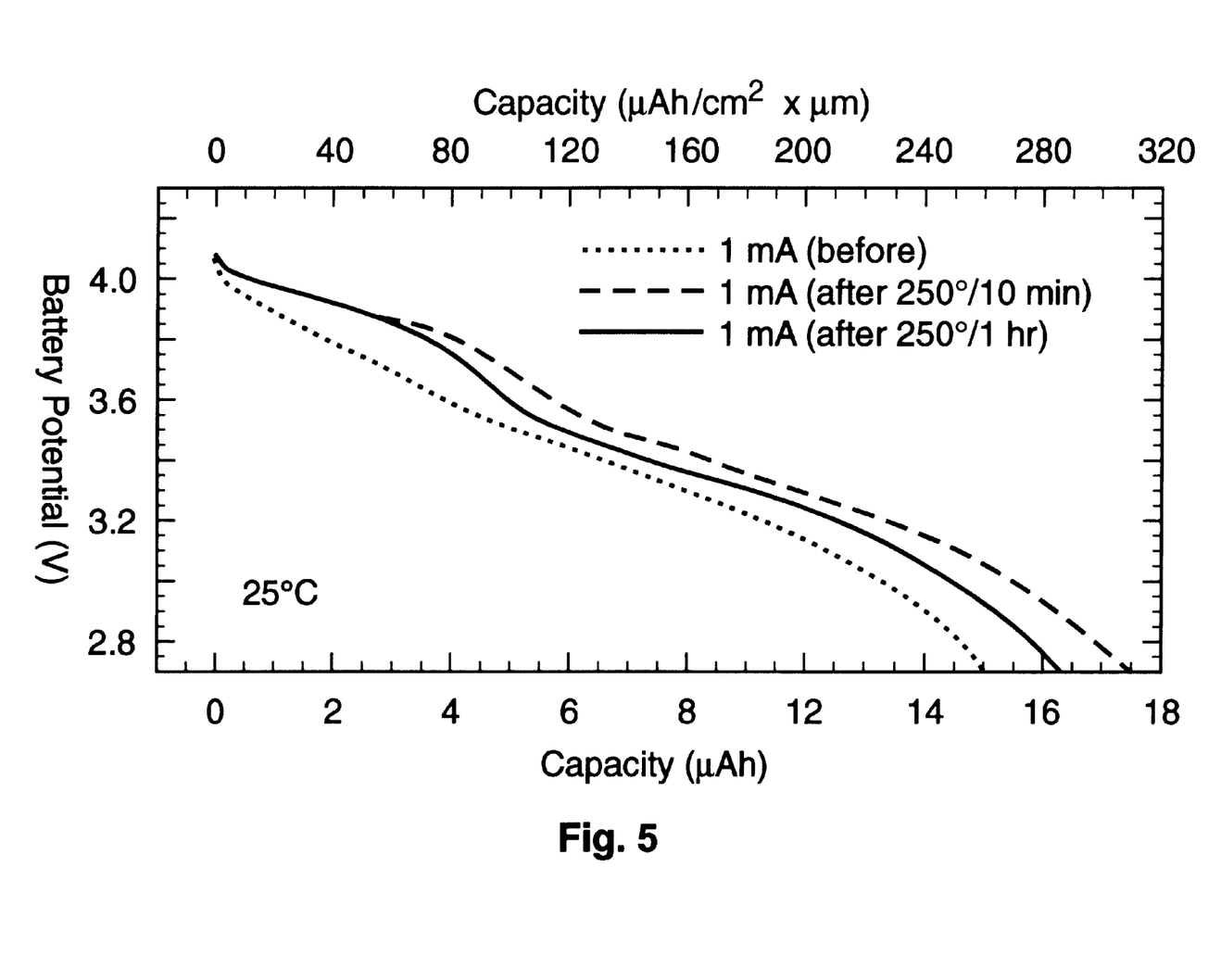
FIG. 5 is a graph showing discharge performance of a 500 Å×1 cm² silicon-tin oxynitride/1 μm×1 cm² Lipon/6,000 Å×1 cm² LiCoO₂ lithium-ion battery at 1 mA/cm² in the voltage range 4.2×2.7 V before and after consecutive thermal heat treatments in air at 250 °C. for 10 min and for 1 h. Electrochemical measurements were made after the battery had been allowed to thermally equilibrate at 25° C. for 24 h. The volumetric capacity refers to the as-deposited anode volume.
Figure 6:
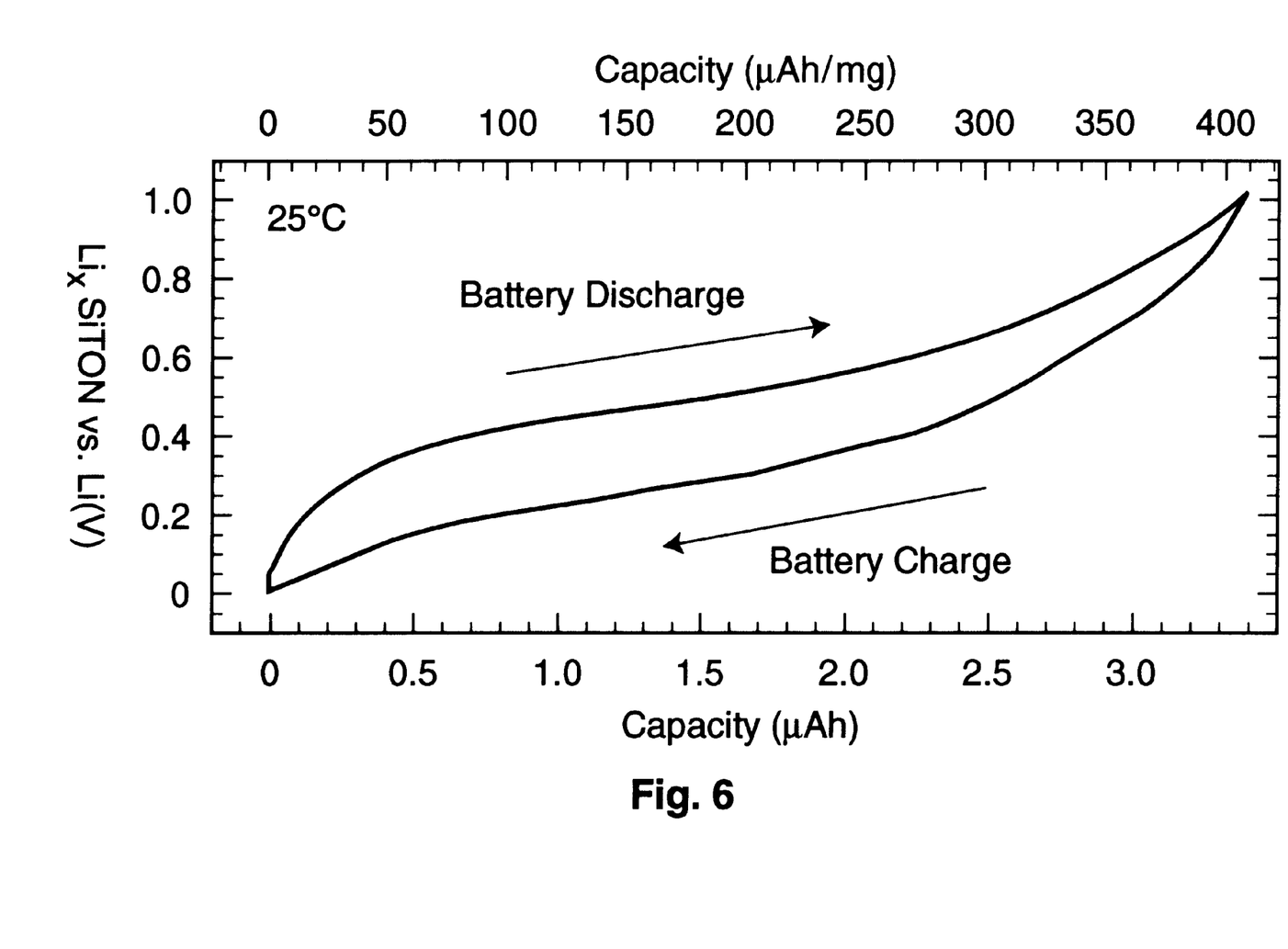
FIG. 6 is a graph showing discharge-charge profiles of a 100 Å×1.2 cm² silicon-tin oxynitride anode monitored by the Li reference electrode of a three-electrode lithium-ion battery including a 2,000 Å×1.2 cm² LiCoO₂ counter-electrode. The battery was operated at 100 μA within the voltage window 3.93–2.7 V and the specific capacity is based on the mass of the fully lithiated anode.

The above-mentioned battery exhibits an excellent cycling performance even at higher current densities, which is illustrated in FIG. 3. Within the voltage window 4.2–2.7 V, 50% of the reversible capacity supplied at 100 $\mu A/cm^2$ is still obtained when increasing the current density by a factor of 50 to 5 $mA/cm^2$. When lithium metal is plated at the anode-electrolyte interface upon deep charging, the lithium-ion battery becomes a lithium battery. The discharge characteristics of a silicon-tin oxynitride based battery between 4.3–2.7 V are shown in FIG. 4. Li plating is reversible and significantly increases the capacity. As shown in FIG. 5, the battery is capable of tolerating temperatures up to at least 250° C. without degrading and even exceeds its initial discharge capacity before the heat treatment. The discharge profiles of the silicon-tin oxynitride anode vs. a lithium reference electrode were monitored in a three-electrode cell configuration with a $LiCoO_2$ counterelectrode and are shown in FIG. 6. It can be seen that at rates of about 100 $\mu A/cm^2$, over 200 $\mu Ah/mg$ of anode can be reversibly discharged below 500 mV vs. $Li^+/Li$, which makes silicon-tin oxynitride an outstanding anode material for thin-film lithium-ion and "lithium-free" lithium batteries.

The basic stoichiometric range of silicon-tin oxynitrides in accordance with the present invention is $Si_aSn_bO_yN_z$ where a+b=2, y≦4, and 0<z≦3. The entire range is electrochemically active and useful in batteries. Silicon-tin oxynitride in the given stoichiometric range can be prepared by the methods taught herein as an x-ray amorphous thick or thin film.

Idota et al. disclose a $SnSi_{0.8}Al_{0.2}P_{0.2}O_{3.4}$ anode assembled in a battery together with a $LiCoO_2$ cathode. The battery is alleged to deliver in the first discharge cycle 562 $\mu Ah/mg$ between 4.3–2.7 V at 750 $\mu A/cm^2$. The above-referenced Idota et al. patent refers to discharge capacity as "mAh/g per active negative electrode material". Since their anode does not contain any lithium ions at the time of cell assembly, it is assumed that their stated discharge capacity is based on the fully charged anode mass, i.e. the as-prepared anode including the whole amount of inserted lithium.

As shown in FIG. 4, we obtain a gravimetric discharge capacity of 1320 $\mu Ah/mg$ (1320 mAh/g) for the fully charged silicon-tin oxynitride anode, including lithium, in the voltage range 4.3–2.7 V at 750 $\mu A/cm^2$. Thus, anodes made in accordance with the present invention are characterized by a specific discharge capacity more than 2.3 times that of Idota et al. When comparing our silicon-tin oxynitride anode with the $SnSi_{0.8}Al_{0.2}P_{0.2}O_{3.4}$ anode, it has to be considered that the discharge capacity of the latter one is supported by conducting additives which are not needed in the thin-film silicon-tin oxynitride anodes.

In comparison with the present invention, the Kobayashi et al. patent, for the "$M_1$" metal requires 26–70 at % Ca, as stated in column 5, line 8 thereof: "The oxynitride glass contains CaO as an essential component." The oxynitrides of the present invention exclude generally Ca as a component of the composition.

Further in comparison with the present invention, Kobayashi's invention is exclusively related to reinforcing glass fibers and deals with Vickers hardness and elastic moduli only. Electrochemical, electronic, and electrochromic properties are not mentioned therein.

Further in comparison with the present invention, Kobayashi states in column 5, line 57: ". . . if the nitrogen content is over 30 at % then the glass is crystallized." The oxynitrides of the present invention are in glass form over the entire anion range, i.e. from the essentially pure oxide to the essentially pure nitride, as evidenced by x-ray diffraction (XRD) data shown in Table I. The film having a nominal composition of $Sn_3N_4$ is called an oxynitride because it contains oxygen ions as "impurities" in a concentration of 1 at % or less.

TABLE I

| Compositions of XRD-Amorphous Oxynitride Films |
|---|
| $SiSn_{0.87}O_{1.20}N_{1.2}$ |
| $SiSn_{0.87}C_{0.05}O_{1.20}N_{1.72}$ |
| $SiSnO_4$ |
| $Sn_3N_4$ (≦1 at % O) |
| $Li_{7.5}SiSn_{0.87}O_{1.20}N_{1.72}$ |
| $Li_{5.6}SiSn_{0.87}O_{1.20}N_{1.72}$ |
| $Li_{4.7}SiSn_{0.87}O_{1.20}N_{1.72}$ |
| $Li_{3.5}SiSn_{0.87}O_{1.20}N_{1.72}$ |

Moreover, lithium may be included in compositions of the present invention, for example, $Li_xSi_aSn_bO_yN_z$ where x≦100, a+b=2, y≦4, and 0<z≦3.

The introduction of Li is accomplished by thermal evaporation of Li metal from a Ta crucible at $10^{-6}$ mbar onto a silicon-oxynitride film (prepared as outlined above). The subsequent diffusion of the lithium into the silicon-tin oxynitride film is completed after several hours at room temperature. If desired, the diffusion can be completed in a shorter time period by heating above room temperature, e.g. about 70° C.

Alternatively, the introduction of Li is done electrochemically where a silicon-tin oxynitride film electrode (silicon-tin oxynitride film deposited onto a suitable electronically conducting substrate, e.g., Ti or Cu foil) is immersed in a typical nonaqueous electrolyte (e.g., 1 M solution of $LiPF_6$ dissolved in an ethylene carbonate/diethyl carbonate mixture) where a Li metal anode serving as Li source and as a counter electrode is immersed as well. Alternatively, lithiated silicon-tin oxynitride films are deposited by rf sputtering from a $Li_3N$ target, prepared by melting $Li_3N$ powder into a stainless steel crucible under $N_2$ at 900° C., with small pieces of Si and Sn placed on top of the target. The composition of the reactive sputter gas mixture $N_2/O_2/Ar$ determines the stoichiometry of the glassy $Li_xSi_aSn_bO_yN_z$ films.

Carbon may be included in compositions of the present invention, for example, $Si_aSn_bC_cO_yN_z$ where a+b=2, c≦10, y≦24, and 0<z≦17. Carbon can be introduced in valence states between 0 and +4 which, if the valence states are higher than zero, is charge-balanced by an additional amount of oxygen and nitrogen anions.

The introduction of carbon in the zero valence state is achieved by sputtering from a $SnSiO_3$ target that has been melted in a graphite crucible for an extended period of time at 1000° C. under Ar. Alternatively, carbon powder may be added to the $SnSiO_3$ melt, or carbon pieces may be placed onto a $SnSiO_3$ target during rf sputtering.

Choosing $SnC_2O_4$ (tin oxalate) or $SnCO_3$ (tin carbonate) instead of SnO as a starting chemical may introduce carbon valence states higher than zero into the target composition. Sputtering from such targets produces $Si_aSn_bC_cO_yN_z$ films with carbon valence states higher than zero.

$Li_xSi_aSn_bC_cO_yN_z$ films are prepared in the same way as the carbon-free $Li_xSi_aSn_bO_yN_z$ films where x≦100, a+b=2, c≦10, y≦24, and 0<z≦17. For x>8, lithium metal is plated at the anode-electrolyte interface. In the case of rf sputtering from a $Li_3N$ target in a stainless steel crucible, carbon pieces in addition to Si and Sn are placed on top of the target.

Up to 20% of any of the elements Si, Sn, O, and N can be replaced by at least one other element to alter the discharge profile of a battery via changes in the electronic and ionic environment. For example, at least one of F, Cl, Br, I, S, Se, Te can substitute for $O^{2-}$ and/or $N^{3-}$. Moreover, at least one of P, As, Sb, Bi, Ge, Pb can be substituted for Si and/or Sn. Most elements from the groups I-IIIA and I-VIIIB are suitable as substitutes.

Also contemplated are:
1. Thin-film preparation by electron-beam evaporation (EBE) combined with a nitrogen ion beam (Ion-beam assisted EBE). An electron beam is directed onto a $SnSiO_3$ target while the nitrogen ion beam is directed onto the growing film.
2. Thin-film preparation by ion-beam assisted physical vapor deposition (Ion-beam assisted PVD) where inside a vacuum chamber the vapor over molten $SnSnO_3$ is mixed with a nitrogen ion beam near the water-cooled sample holder.
3. Thin-film preparation by chemical vapor deposition (CVD) of volatile reactants such as $Si(N(C_2H_5)_2)_4$, $Sn(N(C_2H_5)_2)_4$, $Si(OC_2H_5)_4$, $Sn(OC_2H_5)_4$, $NH_3$, $N_2O$ etc. Alternatively, the CVD process can be enhanced inside a plasma (Plasma-enhanced CVD or PECVD).
4. Thin-film preparation by molecular beam epitaxy (MBE) in a reactive atmosphere of $NH_3$ or $N_2O$ using Si and Sn effusion cells.
5. Crystalline silicon-tin oxynitride by deposition onto heated substrates. Crystalline silicon-tin oxynitride provides a defined chemical long-range environment for the individual ions thus resulting in a more step-like voltage profile compared to the glassy silicon-tin oxynitride.
6. Material preparation in bulk form may be achieved by exposing molten $SnSiO_3$ to a flowing $NH_3$ atmosphere at 1000° C. Alternatively, bulk preparation may be accomplished by melting an appropriate mixture of $SiO_2$, $Si_3N_4$, SnO, $SnO_2$, $Sn_3N_4$ and the like in an inert atmosphere at temperatures above 1400° C. In order to prepare bulk $Si_aSn_bC_cO_yN_z$, carbon may be added to the starting materials.
7. The bulk preparation of silicon-tin oxynitride may yield glassy material when quenched from the molten state to room temperature and may result in crystalline material when slowly cooled from the molten state to a temperature below the melting point of the silicon-tin oxynitride glass.

Moreover, other applications for silicon-tin oxynitride compositions include:
1. Anodes for a) electrochromic windows and b) electrochromic mirrors. An electrochromic window could be constructed as, for example, amorphous SiC:H (transparent current collector)/$Li_xSi_aSn_bC_cO_yN_z$ (transparent counter electrode where x<3)/lithium phosphorus oxynitride (transparent electrolyte)/$WO_3$ (color-changing working electrode)/ITO (transparent current collector). As lithium is moved back and forth between $Li_xSi_aSn_bC_cO_yN_z$ and $WO_3$, the color of transparent $WO_3$ changes to the blue color of $Li_yWO_3$. Alternatively, the lithium source could be as-deposited $Li_yWO_3$ where the lithium is exchanged with as-deposited $Si_aSn_bC_cO_yN_z$. The construction becomes an electrochromic mirror when deposited onto a light-reflecting metal film like Al or Ag.
2. Silicon-tin oxynitride as an actuator anode, for example in the construction flexible substrate/$Si_aSn_bC_cO_yN_z$/lithium phosphorus oxynitride/$Li_xSi_aSn_bC_cO_yN_z$ where the bending of the substrate depends on the lithium concentration of the respective silicon-tin oxynitride electrode on each side of the lithium phosphorus oxynitride electrolyte.
3. Optical fibers and waveguides.

The use of a glassy silicon-tin oxynitride anode in accordance with the present invention represents an important advancement in thin-film rechargeable batteries by significantly increasing the possible applications to devices in which the presence of metallic lithium is prohibited and in which device assembly temperature exceeds 100° C. In particular, the present invention will allow the battery to be added to integrated circuits during high volume manufacture using the reflow or surface mount process. Applications include using the battery as the active power source in implantable medical devices, such as pacemakers, and sensors and as the backup power source for CMOS memory.

While there has been shown and described what are at present considered the preferred embodiments of the invention, it will be obvious to those skilled in the art that various changes and modifications can be prepared therein without departing from the scope of the inventions defined by the appended claims.

What is claimed is:
1. A composition of matter comprising Ca-free $Si_aSn_bO_yN_z$ wherein a>0, b>0, a+b≦2, 0<y≦4, and 0<z≦3.
2. A composition of matter in accordance with claim 1 wherein a=1.0, b=0.87, y=1.2, and z=1.72.
3. A composition of matter in accordance with claim 1 further comprising $Li_x$ wherein x≦100, said composition of matter further comprising at least one of $LiSi_aSn_bO_y$ and a mixture of $Li_8Si_aSn_bO_yN_z$ and lithium metal.
4. A composition of matter in accordance with claim 1 wherein said Ca-free $Si_aSn_bO_yN_z$ further comprises $Si_aSn_bO_yN_zX_n$ where $X_n$ comprises at least one of the group consisting of F, Cl, Br, I, S, Se, Te, P, As, Sb, Bi, Ge, Pb, elements from the groups I-IIIA, and elements from the groups I-VIIIB.
5. A composition of matter comprising $Si_aSn_bC_cO_yN_z$ where a>0, b>0, a+b>0, a+b≦2, 0<c–10, 0<y<24, and 0<z<17.
6. A composition of matter in accordance with claim 5 wherein said $Si_aSn_bC_cO_yN_z$ further comprises at least one of $Li_vSi_aSn_bO_yN_z$ where 0≦v≦8 and a mixture of $Li_8Si_aSn_bC_cO_yN_z$ and lithium metal.
7. A composition of matter in accordance with claim 5 wherein said $Si_aSn_bC_cO_yN_z$ further comprises $Si_aSn_bC_cO_yN_z X_n$ where $X_n$ comprises at least one of the group consisting of F, Cl, Br, I, S, Se, Te, P, As, Sb, Bi, Ge, Pb, elements from the groups I-IIIA, and elements from the groups I-VIIIB.
8. A lithium-ion battery comprising a cathode and an anode, the anode comprising $Si_aSn_bO_yN_z$ where a>0, b>0, a+b≦2, 0<y≦4, and 0<z≦3.
9. A lithium-ion battery in accordance with claim 8 wherein a=1.0, b=0.87, y=1.2, and z=1.72.
10. A lithium-ion battery in accordance with claim 8 wherein said $Si_aSn_bO_yN_z$ further comprises $Li_x$ wherein x≦100, and for x>8, said lithium-ion battery further comprises $Li_8Si_aSn_bO_yN_z$ and lithium metal which is plated at an anode-electrolyte interface thereof.
11. A lithium-ion battery in accordance with claim 8 wherein said $Si_aSn_bO_yN_z$ further comprises $Si_aSn_bO_yN_z X_n$ where $X_n$ comprises at least one of the group consisting of F, Cl, Br, I, S, Se, Te, P, As, Sb, Bi, Ge, Pb, elements from the groups I-IIIA, and elements from the groups I-VIIIB.
12. A lithium-ion battery in accordance with claim 8 wherein said battery is a thin-film battery.
13. A lithium-ion battery comprising a cathode and an anode, the anode comprising $Si_aSn_bC_cO_yN_z$ where a>0, b>0, a+b≦2, 0<c≦10, 0<y≦24, and 0<z≦17.

14. A lithium-ion battery in accordance with claim 13 wherein said $Si_aSn_bC_cO_yN_z$ further comprises $Li_xSi_aSn_bO_yN_z$ where $0 \leq v \leq 8$ where $x \leq 100$, said lithium-ion battery further comprising at least one of $Li_{>0-8}Si_aSn_bC_cO_yN_z$ and a mixture of $Li_8Si_aSn_bC_cO_yN_z$ and lithium metal.

15. A lithium-ion battery in accordance with claim 13 wherein said $Si_aSn_bC_cO_yN_z$ further comprises $Si_aSn_bC_cO_yN_zX_n$ where $X_n$ comprises least one of the group consisting of F, Cl, Br, I, S, Se, Te, P, As, Sb, Bi, Ge, Pb, elements from the groups I-IIIA, and elements from the groups I-VIIIB.

16. A lithium-ion battery in accordance with claim 13 wherein said battery is a thin-film battery.

17. An electrochromic device comprising $Si_aSn_bO_yN_z$ wherein $a>0$, $b>0$, $a+b \leq 2$, $0 \leq y \leq 4$, and $0<z \leq 3$.

18. An electrochromic device in accordance with claim 17 wherein $a=1.0$, $b0.87$, $y=1.2$, and $z=1.72$.

19. An electrochromic device in accordance with claim 17 further comprising $Li_x$ wherein $x \leq 100$, said electrochromic device further comprising at least one of $Li_xSi_aSn_bO_yN_z$ where and a mixture of $Li_8Si_aSn_bO_yN_z$ and lithium metal.

20. An electrochromic device in accordance with claim 17 wherein said $Si_aSn_bO_yN_z$ further comprises $Si_aSn_bO_yN_zX_n$ where $X_n$ comprises at least one of the group consisting of F, Cl, Br, I, S, Se, Te, P, As, Sb, Bi, Ge, Pb, elements from the groups I-IIIA, and elements from the groups I-VIIIB.

21. An electrochromic device in accordance with claim 17 wherein said electrochromic device is an electrochromic mirror or an electrochromic window.

22. An electrochromic device comprising $Si_aSn_bC_cO_yN_z$ where $a>0$, $b>0$, $a+b \leq 2$, $0<c \leq 10$, $0<y \leq 24$, and $0<z \leq 17$.

23. An electrochromic device in accordance with claim 22 wherein said $Si_aSn_bC_cO_yN_z$ further comprises $LiSi_aSn_bO_yN_z$ where $0 \leq v \leq 8$ where $x \leq 100$, said electrochromic device comprising at least one of $Li_{>0-8}Si_aSn_bC_cO_yN_z$ and a mixture of $Li_8Si_aSn_bC_cO_yN_z$ and lithium metal.

24. An electrochromic device in accordance with claim 22 wherein said $Si_aSn_bC_cO_yN_z$ further comprises $Si_aSn_bC_cO_yN_zX_n$ where $X_n$ comprises at least one of the group consisting of F, Cl, Br, I, S, Se, Te, P, As, Sb, Bi, Ge, Pb, elements from the groups I-IIIA, and elements from the groups I-VIIIB.

25. An electrochromic device in accordance with claim 22 wherein said electrochromic device is an electrochromic mirror or an electrochromic window.

* * * * *